United States Patent [19]

Shinbori et al.

[11] 4,452,435
[45] Jun. 5, 1984

[54] APPARATUS FOR CONTROLLING FRICTION BETWEEN LEAF SPRINGS OF A LAMINATED LEAF SPRING ASSEMBLY

[75] Inventors: Takeyoshi Shinbori, Yokosuka; Yoshio Kimura, Yokohama, both of Japan

[73] Assignee: NHK Spring Co., Ltd., Yokohama, Japan

[21] Appl. No.: 379,470

[22] Filed: May 18, 1982

[30] Foreign Application Priority Data

May 27, 1981 [JP] Japan .................................. 56-80597
May 27, 1981 [JP] Japan .................................. 56-80598

[51] Int. Cl.³ ............................................. B60G 11/02
[52] U.S. Cl. .................................. 267/36 A; 267/9 R; 267/18; 280/718
[58] Field of Search ....................... 267/7, 9 R, 18, 24, 267/31, 36 A, 48, 54 C, 89, 90, 82, 158; 280/710, 714, 718

[56] References Cited

U.S. PATENT DOCUMENTS 3,294,390 12/1966 Warmkessel ........................... 267/18
4,022,449 5/1977 Estorff ................................... 267/48

FOREIGN PATENT DOCUMENTS 410905 3/1925 Fed. Rep. of Germany ........ 267/18
116250 10/1926 France .................................. 267/48
55-93747 12/1978 Japan .
261023 3/1927 United Kingdom .................. 267/48

Primary Examiner—Bruce H. Stoner, Jr.
Assistant Examiner—Robert J. Oberleitner
Attorney, Agent, or Firm—Frishauf, Holtz, Goodman and Woodward

[57] ABSTRACT

An apparatus for controlling friction between the leaf springs of a laminated leaf spring assembly comprises a clamp mounted on the laminated leaf spring assembly for clamping the assembly in the direction of its thickness, and a hydraulic cylinder urging the laminated leaf spring assembly against a supporting member of the clamp. A return spring having a number of initially coned disc springs is disposed in a rod chamber of the hydraulic cylinder. The pressure of a pressurized fluid supplied into a head chamber of the hydraulic cylinder is controlled by a control valve. The operating pressure of the control valve is controlled by detecting the variations in predetermined factors of a body to be supported and supplying signals to the control valve in accordance with the variations.

4 Claims, 9 Drawing Figures

APPARATUS FOR CONTROLLING FRICTION BETWEEN LEAF SPRINGS OF A LAMINATED LEAF SPRING ASSEMBLY

BACKGROUND OF THE INVENTION

The present invention relates to an apparatus for controlling the friction between the leaf springs of a laminated leaf spring assembly in accordance with the state of a body to be supported.

A laminated leaf spring assembly including a number of leaf springs has been widely used for suspending a body to be supported, for example, the body of a vehicle. When the laminated leaf spring assembly is used for suspending the vehicle, the comfort, the driving stability and the like are influenced by the spring constant, the friction between the leaf springs of the assembly and the like. The degree of such influence depends on the vehicle speed, the condition of the road surface and the like. In general, when the vehicle runs on a smooth road, the smaller the friction acting on the opposing surfaces of each pair of adjacent leaf spings, that is, the friction between the leaf springs, the better becomes the comfort. On the other hand, a higher driving stability is attained when the friction between the leaf springs is large. The comfort is considered to be more important than the driving stability on the smooth road, since sufficient driving stability is ensured if a steering wheel is not suddenly turned.

A laminated leaf spring assembly including a number of tapered leaf springs has been proposed. The tapered leaf springs are decreased in thickness toward the ends. The weight of the laminated leaf spring assembly including such a construction is smaller than that including leaf springs of the constant thickness since the number of the former may be smaller than that of the latter. If the number of the leaf springs is smaller than that of the prior art laminated leaf spring assembly, the friction between the leaf spring is reduced. As a result, a shock absorber of a large capacity is required to improve the comfort on a rough road. However, such a shock absorber of a large capacity is expensive. In addition, the comfort is sometimes impaired, since the shock absorber provides constant damping even if the damping is not needed. Therefore, a clamping means is used for clamping the leaf springs near the ends thereof in the direction of their thickness to increase the friction between the leaf springs. The conventional clamping means securely clamps the leaf springs by bolts. As a result, the friction between the leaf springs is maintained at a large value so that the comfort on the rough road is improved. However, the comfort on the smooth road is unsatisfactory.

The laminated leaf spring assembly is also used for preventing the vibration of bodies to be supported other than the vehicle, for example, a reciprocating machine such as a compressor or a rotating machine such as an electric generator. In this case, the friction between the leaf springs is preferably increased only when a shock or resonance occurs. However, the friction between the leaf springs is also kept constant in the case of such a laminated leaf spring assembly for preventing the vibration.

SUMMARY OF THE INVENTION

It is therefore an object of the present invention to provide an apparatus for controlling the friction between the leaf springs of a laminated leaf spring assembly in which the friction between the leaf springs is optimized by varying it in accordance with the state of a body to be supported.

In order to achieve the object described above, according to the present invention, the apparatus for controlling the friction between the leaf springs of the laminated leaf spring assembly comprises clamping means mounted on the laminated leaf spring assembly for clamping the laminated leaf spring assembly in the direction of its thickness to adjust the friction between the leaf springs. The clamping means includes a supporting member and a pressure member which clamp the laminated leaf springs therebetween. The pressure member is connected to the free end of a piston of a hydraulic cylinder means. The pressure of a pressurized fluid supplied to a head chamber defined within a cylinder of the hydraulic cylinder means acts on the laminated leaf spring assembly through the piston and the pressure member. A return spring having a number of initially coned disc springs is disposed in a rod chamber defined within the cylinder of the hydraulic cylinder means. The pressure of the pressurized fluid is controlled by a control valve of a hydraulic control means. The operating pressure is regulated by detecting, by a detector means, predetermined factors of the body to be supported, for example, the acceleration of a vehicle body and by supplying predetermined signals to the control valve in accordance with the detection results.

In the construction described above, the pressure of the pressurized fluid is controlled in accordance with the values of the factors of the body to be supported to optimize the friction between the leaf springs of the laminated leaf spring assembly. If the laminated leaf spring assembly is used for suspending a vehicle, the pressure of the pressurized fluid is set to low levels on a smooth road to decrease the friction between the leaf springs. On the other hand, when the vehicle runs on a rough road or at turns, the pressure of the pressurized fluid is increased to thereby increase the friction between the leaf springs. Therefore, the optimum comfort is constantly maintained. When the laminated leaf spring assembly is used for preventing the vibration of the reciprocating machine and the like, the pressure of the pressurized fluid is increased only in the case of resonance so that the optimum friction between the leaf springs is readily obtained. Since the return spring comprises the initially coned disc springs, the hydraulic cylinder means can be made compact in size. Furthermore, the apparatus according to the invention may be set to the body to be supported without removing the already attached members such as a shackle and a bracket, since the clamping means is mounted not on the body to be supported but directly on the laminated leaf spring assembly. Therefore, the mounting position of the apparatus according to the present invention is not particularly limited.

DETAILED DESCRIPTION OF THE PREFERRED EMBODIMENTS

Figure 1:
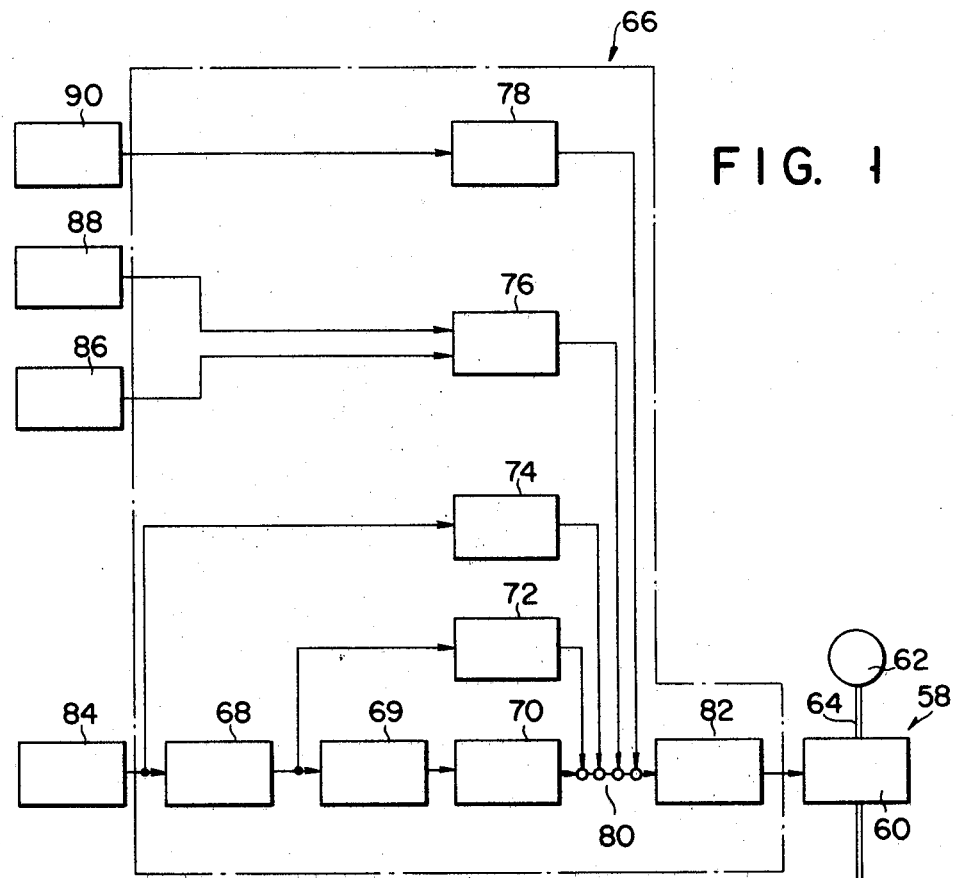
FIG. 1 is a front view of a laminated leaf spring assembly and a block diagram of an apparatus for controlling the friction between the leaf springs of the laminated leaf spring assembly according to a first embodiment of the present invention.
Figure 1:
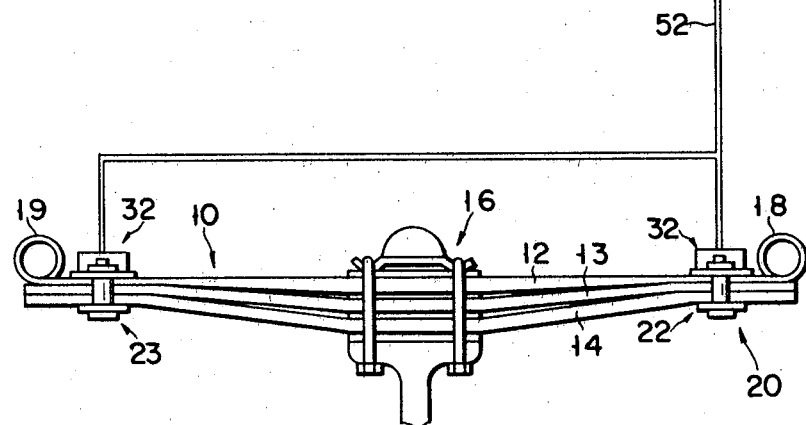

Referring to FIG. 1, a laminated leaf spring assembly 10 includes a plurality of, for example three leaf springs 12, 13 and 14. In this embodiment, the leaf springs 12, 13 and 14 are formed as tapered leaf springs. However, they are not limited to tapered leaf springs and may be partially tapered leaf springs or leaf springs of a constant thickness. The leaf springs 12, 13 and 14 may be of different lengths and be laminated in a stepped form. The laminated leaf spring assembly 10 is clamped at the center by a U-bolt assembly 16 in the direction of its thickness as in the prior art. If the laminated leaf spring assembly 10 is used for suspending a vehicle body, it is connected to a rear axle (not shown) of the vehicle body through the U-bolt assembly 16, for example. Spring eyes 18 and 19 are integrally formed at the both ends of the main or uppermost leaf spring 12. These spring eyes 18 and 19 are movably attached to the vehicle body by a shackle assembly (not shown), for example.

An apparatus 20 for controlling the friction between the leaf springs of the laminated leaf spring assembly 10 comprises a pair of clamping means 22 and 23. The clamping means 22 and 23 are respectively disposed at the ends of the laminated leaf spring assembly 10. But only one clamping means 22 or 23 may be arranged at one end of the assembly 10. The clamping means 22 and 23 are of the same structure and serve to clamp the leaf springs 12, 13 and 14 in the direction of their thickness and to permit the sliding movement of the leaf springs relative to each other.

Figure 2:
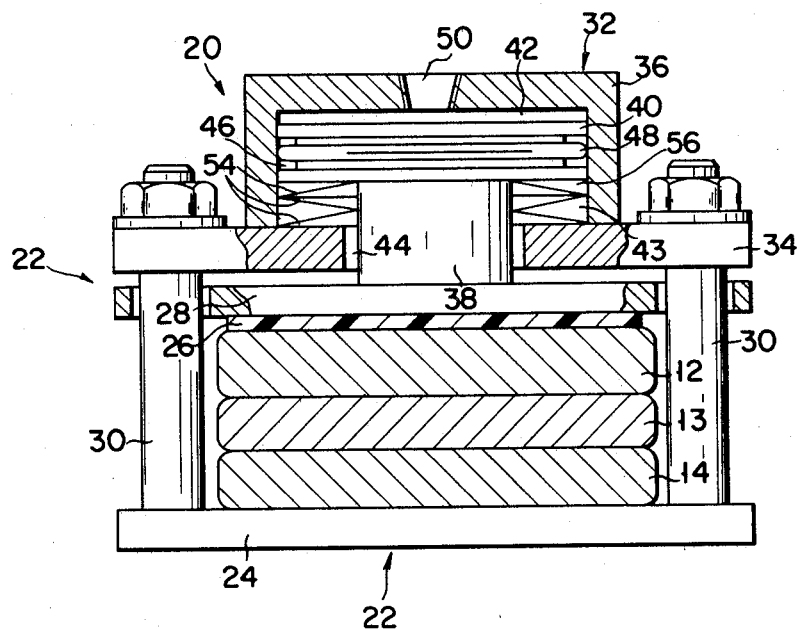
FIG. 2 is a longitudinal sectional view of a clamping means and a hydraulic cylinder means according to the first embodiment.

The construction of the clamping means 22 will be described below. Referring now to FIG. 2, the clamping means 22 comprises a spring supporting member 24 which can abut against the lower surface of the leaf spring 14, and a pressure member 28 for pressing against the upper surface of the leaf spring 12 through an intermediate member 26. The pressure member 28 and the spring supporting member 24 hold and clamp the leaf springs 12, 13 and 14 therebetween. The intermediate member 26 is made of, for example an elastic material such as hard rubber so as to permit the sliding movement of the leaf spring 12 relative to the pressure member 28. A plurality of, for example four, bolts 30 (only two bolts are shown in FIG. 2) are uprightly erected on the spring supporting member 24. The pressure member 28 is vertically movably supported by the bolts 30.

A hydraulic cylinder means 32 is mounted on the clamping means 22. More particularly, the hydraulic cylinder means 32 comprises a cylinder 36 having at its open end an integrally formed outer flange 34. The outer flange 34 is securely fixed to the free ends of the bolts 30 by nuts. A piston 38 is vertically movably arranged in the cylinder 36. A piston head 40 integrally formed at one end of the piston 38 divides the interior of the cylinder 36 into a head chamber 42 and a rod chamber 43. The other or free end of the piston 38 extends outward through a central hole 44 of the flange 34 to be fixed to the pressure member 28. The piston head 40 has an annular groove 46 in which an O-ring 48 is disposed. A port 50 is formed in the base wall of the cylinder 36. A pressurized fluid such as pressurized oil flows into or from the head chamber 42 through a single duct 52 connected to the port 50 (see FIG. 1). A return spring 56 having a number of, for example three, in this embodiment, initially coned disc springs 54 is arranged in the rod chamber 43. The initially coned disc springs 54 are of such a shape as to prevent the piston from tilting. In other words, each of the disc springs 54 has an outer diameter slightly smaller than the inner diameter of the cylinder 38 and also has a central hole of a diameter slightly larger than the outer diameter of the piston 38.

In the clamping means 22 and 23 of the construction described above, the piston 38 slides in the cylinder 36 to press the pressure member 28 downward, when the pressurized fluid is supplied into the head chamber 42 of the cylinder 36 through the port 50. Then, the pressure member 28 and the spring supporting member 24 hold and clamp the leaf springs 12, 13 and 14 therebetween through the intermediate member 26. The force acting as the piston 38 can be controlled by controlling the pressure of the pressurized fluid acting on the piston head 40. By controlling the force of the piston 38, in turn, the friction between the leaf springs 12 and 13 as well as between leaf springs 13 and 14 can be controlled. When the pressurized fluid is drained, the biasing force of the return spring 56 causes the piston 38 to return to its retracted position, so that the pressurized fluid in the head chamber 42 flows out through the port 50. Since the return spring 56 has the initially coned disc springs 54, the tilting movement of the piston 38 can be readily prevented. Also, the disc springs 54 provide a relatively large biasing force so that a return spring of relatively small height may be used. Further, since no fluid is introduced into that side of the hydraulic cylinder means 32 to which the disc springs 54 are inserted, packing need not be provided between the piston 38 (i.e. piston rod) and the cylinder means which are shown in FIG. 1. A port or piping need not be provided, either, to introduce fluid to the lower portion of the piston head 40. As a result, a shorter cylinder and therefore the hydraulic cylinder means 32 of a relatively compact construction can be used. In this manner, since the compact hydralic cylinder means 32 is combined with the clamping means 22 and 23, a desired number of clamping means can be mounted in the desired longitudinal positions of the laminated leaf spring assembly 10 without obstructing the positioning of the vehicle body and the axle. Although vibration of relatively large magnitude is produced directly in the vehicle body or on the axle, the vibration of the laminated leaf spring assembly 10 for suspending these parts is relatively small. In addition, the clamping means 22 and 23 are arranged not between the vehicle body or the axle and the laminated leaf spring assembly 10 but mounted directly on the assembly 10. Therefore, the clamping means 22 and 23 need not have very good vibration-proof properties and can be of a simple and compact structure.

The apparatus 20 for controlling the friction between the leaf springs further comprises a hydraulic control means 58, as shown in FIG. 1. The hydraulic control means 58 includes a control valve 60 for controlling the pressure of the pressurized oil supplied into the head chamber 42 through the single duct 52. The control valve 60 is connected through a duct 64 to a fluid source 62 having a reservoir, a motor and a pump. Since the valve 60 is used only for introducing pressurized oil into the head chamber 42 of the apparatus 20 or discharging the pressurized oil therefrom, it can be made simple in structure. Therefore, the apparatus 20 of the present invention has the following merits: that the valve 60 is simple in structure, that only a single pipe is required, and that the apparatus 20 can be disposed in the narrow space between the vehicle body and the spring assembly 10 (FIG. 1). Owing to these merits, the apparatus of the present invention can withstand long use, the maintenance operations to the apparatus can be performed easily, and the manufacturing cost of the apparatus will be reduced.

The control apparatus 20 further comprises a detector means 66 for detecting the predetermined factors of the vehicle movement to control the operating pressure of the control valve 60, as shown in FIG. 1. The detector means 66 includes first and second series-connected integrating circuits 68 and 69; a first control circuit 70, a second control circuit 72 connected to the input end of the second integrating circuit 69 and in parallel with the first control circuit 70; and a third control circuit 74 connected to the input end of the first integrating circuit 68 and in parallel with the first control circuit 70. Furthermore, fourth and fifth control circuits 76 and 78 are connected in parallel with the first, second and third control circuits 70, 72 and 74. The output ends of the first to fifth control circuits 70, 72, 74, 76 and 78 are connected to a synthesizing unit 80. The outputs from these control circuits are synthesized in a predetermined ratio. The output end of the synthesizing unit 80 is connected to the control valve 60 through an amplifier 82.

The control circuits 70, 72, 74 and 76 are respectively connected to sensors for sensing predetermined factors of the vehicle movement, for example, the vertical or horizontal acceleration, the speed, and the displacement of the vehicle body, as well as the steering angle of the steering wheel. The respective sensors are so constructed as to sense the corresponding factors such as the acceleration to produce predetermined signals, as is well known in the prior art. In this embodiment, a sensor for sensing the vertical acceleration of the vehicle body is connected in parallel with the input end of the first integrating circuit 68. A sensor 86 for sensing the steering angle of the steering wheel and a sensor 88 for sensing the vehicle speed are connected in parallel with the input end of the fourth control circuit 76. A manual control unit 90 is connected to the input end of the fifth control circuit 78.

Figure 3:
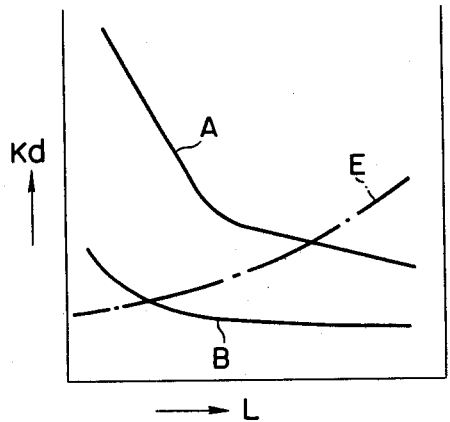
FIGS. 3 and 4 are graphs for explaining a dynamic spring constant Kd and an equivalent damping coefficient Ea as a function of a vibration amplitude L, respectively.
Figure 4:
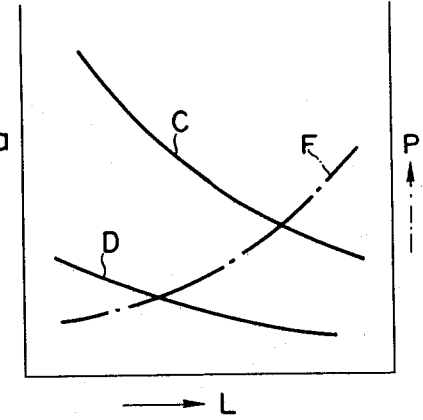

In the above construction, the output signals from the first to fourth control circuits 70, 72, 74 and 76 are cut off and the manual control unit 90 is appropriately set to keep the output of the amplifier 82 constant. Then, the pressure of the pressurized fluid supplied to the hydraulic cylinder means 32 through the control valve 60 is maintained constant. As a result, the friction between the leaf springs is also kept constant and the control apparatus 20 acts in the same manner as the conventional clamping means. FIG. 3 shows the vibration amplitude L at the end of the laminated leaf spring assembly 10 as a function of a dynamic spring constant Kd. In FIG. 3, the characteristic curve indicated by solid line A is obtained when the pressure of the pressurized fluid is at a constant high level, and that indicated by solid line B is obtained when it is at a constant low level. FIG. 4 shows an equivalent damping coefficient $E_a$ calculated from the friction between the leaf springs as a function of the vibration amplitude L. The characteristic curve indicated by solid line C is obtained when the pressure of the pressurized fluid is at a constant high level and that indicated by solid line D is obtained when it is at a constant low level.

The output signals from the first, second and third control circuits 70, 72 and 74 control the control valve 60 so that the pressure P of the pressurized fluid increases with the vibration amplitude L as shown by one-dot chain lines E and F of FIGS. 3 and 4, respectively. Then, when the variation amplitude L is small, for example on the smooth road, the pressure P of the pressurized fluid is decreased and the friction between the leaf springs is also reduced to improve the comfort. On the other hand, when the vibration amplitude L is large, for example on the rough road, the pressure P and the equivalent damping coefficient $E_a$ are both increased to increase the friction between the leaf springs and to improve the comfort. Thus, good comfort is constantly maintained regardless of the condition of the road surface. Furthermore, a control signal corresponding to the centripetal acceleration of the vehicle body is issued from the fourth control circuit 76 in accordance with the output signals from the sensor 86 for detecting the steering angle of the steering wheel and from the sensor 88 for detecting the vehicle speed. The pressure P of the pressurized fluid increases with the centripetal acceleration so that the excellent comfort is maintained. In addition, the tilting of the body caused by the centripetal acceleration can be suppressed to greatly improve the driving stability of the vehicle during the turning movement. Means for detecting the displacement, the speed and the acceleration of one of the leaf springs 12, 13 and 14 of the laminated leaf spring assembly 10 on both sides of the body, may be provided in place of or together with the sensors 86 and 88. Alternatively, reference signal generators may be provided in all or some of the control circuits 70, 72, 74, 76 and 78, so that desired control may be performed.

Desired control may be performed through the manual control unit 90 instead of automatic control circuit. Alternatively, manual control may be performed to respond to the need of the driver or the load conditions or to correct automatic control.

Figure 5:
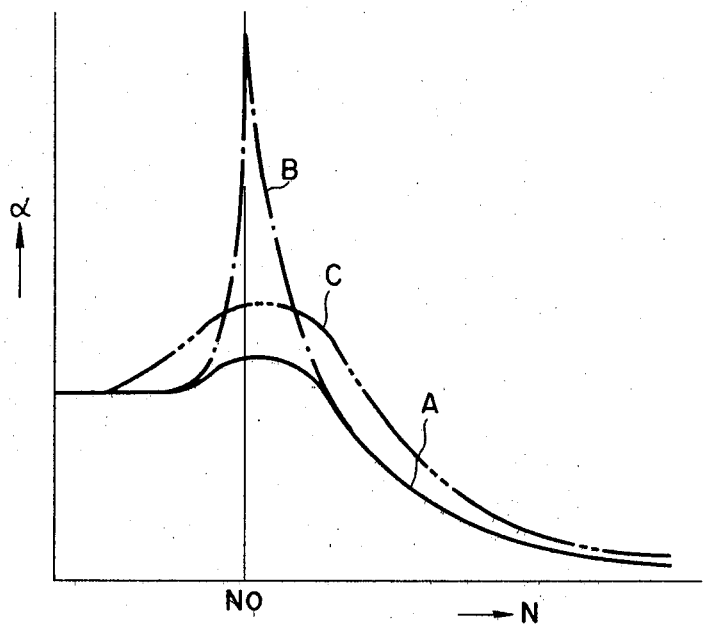
FIG. 5 is a graph for explaining a vibration frequency as a function of a vibration transmissibility.

The control apparatus 20 can be also used for preventing the vibration of a rotating machine and the like. In this case, when the sensor 84, for example, senses that the vibration frequency N of the rotating machine is near the resonance point No as shown in FIG. 5, it serves to increase the operating pressure of the control valve 60 and to increase the pressure of the pressurized fluid. Consequently, an excellent vibration-proof characteristic is obtained, the vibration transmissibility of which is as indicated by solid line A of FIG. 5. The vibration-proof characteristic as indicated by one-dot chain line B is obtained when the friction between the leaf springs is maintained constant as in the case of the prior art laminated spring assembly, and that as indicated by two-dot chain line C is obtained when the laminated leaf spring assembly is combined with a shock absorber.

Figure 6:
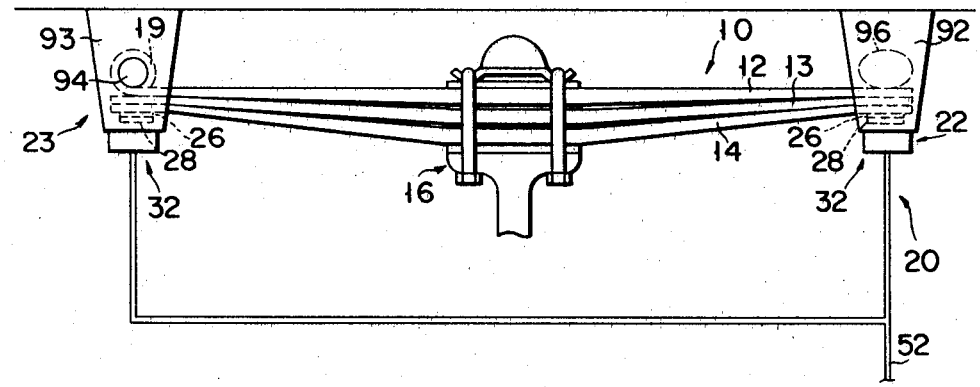
FIG. 6 is a partial front view of an apparatus for controlling the friction between the leaf springs of a laminated leaf spring assembly according to a second embodiment of the present invention.
Figure 7:
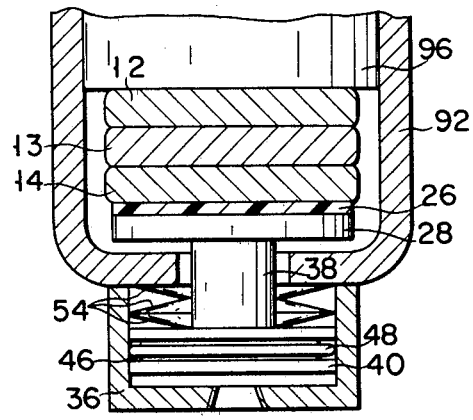
FIG. 7 is a longitudinal sectional view of a clamping means and a hydraulic cylinder means of the control apparatus according to the second embodiment.

FIGS. 6 and 7 show a second embodiment of the present invention wherein the piston is urged against the lowermost leaf spring 14 through the intermediate member 26. In this embodiment, the same reference numerals designate the same parts as those in the first embodiment shown in FIGS. 1 and 2. A laminated leaf spring assembly 10 is mounted to the vehicle body by brackets 92 and 93. A main leaf spring 12 has at its left end a spring eye formed integrally therewith. The spring eye 19 is pivotally supported on the bracket 93 by a pin 94. A guide member 96 which abuts against the upper surface of the leaf spring 12 to allow the sliding movement of the right end of the leaf spring 12 is mounted to the bracket 92. Two pressure members 28 are provided which clamp the leaf springs 12, 13 and 14 between itself, and the pin 94 and the guide member 96 through the intermediate member 26, respectively. The basic construction and the mode of operation of clamping means 22 and 23 are the same as in the first embodiment and therefore a detail description thereof is omitted here. The control apparatus of the second embodiment has the same advantages as in the first embodiment. In addition, since a cylinder 36 of a hydraulic cylinder means 32 and a duct 52 extend in the direction to be apart from the vehicle body, a sufficient distance is advantageously ensured between them and the vehicle body.

Figure 8:
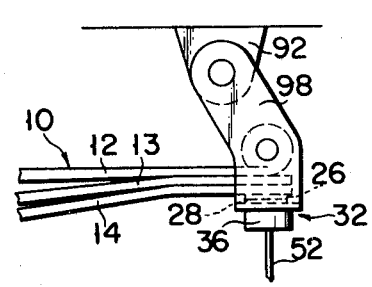
FIGS. 8 and 9 are partial front views of laminated leaf spring assemblies according to the third and fourth embodiments of the present invention, respectively.
Figure 9:
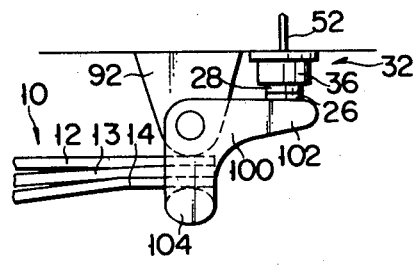

It is readily understood that the control apparatus according to the present invention is not limited to the first and second embodiments. For example, the hydraulic cylinder means 32 may be connected to the bracket 92 through a shackle assembly 98, as shown in FIG. 8. Alternatively, an L-shaped crank 100 may be pivotally mounted to the bracket 92 as shown in FIG. 9. In this case, one end 102 of the crank 100 is connected to the pressure member 28 of the clamping means through the intermediate member 26. The ends of the leaf springs 12, 13 and 14 are clamped between the other end 103 of the crank 100 and the lower end of the bracket 92. In the construction including the crank 100, the dynamic spring constant Kd and the equivalent damping coefficient Ea can be simultaneously controlled by controlling the pressure of the pressurized fluid. The lower end of the bracket 92 functions as a spring supporting member. The number of leaf springs is not limited and, a single leaf spring may be used.

What we claim is:

1. An apparatus for controlling friction between leaf springs of a laminated leaf spring assembly, comprising:

clamping means mounted on the laminated leaf spring assembly, which is attached at both ends thereof to a body to be supported to elastically support the body to be supported, for clamping said laminated leaf spring assembly in the direction of thickness thereof, said clamping means including a spring supporting member and a pressure member which clamp said laminated leaf spring assembly therebetween;

hydraulic cylinder means for pressing said pressure member to urge said laminated leaf spring assembly against said spring supporting member, said hydraulic cylinder means including a cylinder having a closed end side and an open end side, a piston having an integrally formed head for dividing an interior of said hydraulic cylinder into a head chamber located on the closed end side of said hydraulic cylinder and a rod chamber located on the open and side of said hydraulic cylinder, a free end of said piston being connected to said pressure member, and a return spring having a number of initially coned disc springs and arranged in said rod chamber to urge said piston toward the closed end of said hydraulic cylinder, said initially coned disc springs having central holes through which said piston extends;

hydraulic controlling means connected to said head chamber by means of a single duct and having a control valve adapted to lead a pressurized fluid into said head chamber and to guide the pressurized fluid to be discharged from said head chamber; and detecting means for detecting values of predetermined factors of the body to be supported and supplying predetermined signals to said control valve in accordance with the detected values so as to control the operating pressure of said control valve.

2. An apparatus according to claim 1, wherein each of the central holes of said initially coned disc springs has a diameter to define a guide for preventing said piston from tilting.

3. An apparatus according to claim 1 or 2, wherein said spring supporting member includes part of a bracket for mounting said laminated leaf spring assembly to the body to be supported, and said pressure member transmits force to said laminated leaf spring assembly through an L-shaped crank pivotally mounted on said bracket.

4. An apparatus according to claim 3, wherein the body to be supported is a body of a vehicle, and the predetermined factors to be detected by said detecting means are an acceleration of the vehicle body or a steering angle of a steering wheel and a speed of the vehicle body.

* * * * *

UNITED STATES PATENT AND TRADEMARK OFFICE
CERTIFICATE OF CORRECTION

PATENT NO. : 4,452,435

DATED : June 5, 1984

INVENTOR(S) : Takeyoshi SHINBORI et al

It is certified that error appears in the above-identified patent and that said Letters Patent is hereby corrected as shown below:

Column 8, line 14, change "and" to --end--.

Signed and Sealed this

Thirtieth Day of April 1985

[SEAL]

Attest:

DONALD J. QUIGG

Attesting Officer     Acting Commissioner of Patents and Trademarks